United States Patent
Whitten

(10) Patent No.: US 9,055,333 B2
(45) Date of Patent: Jun. 9, 2015

(54) MANAGEMENT AND UTILIZATION OF RECORDED VIDEO CONTENT

(75) Inventor: Robert C. Whitten, Kennesaw, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 364 days.

(21) Appl. No.: 12/892,556

(22) Filed: Sep. 28, 2010

(65) Prior Publication Data

US 2012/0079548 A1   Mar. 29, 2012

(51) Int. Cl.
| | |
|---|---|
| G06F 3/00 | (2006.01) |
| G06F 13/00 | (2006.01) |
| H04N 5/445 | (2011.01) |
| H04N 21/442 | (2011.01) |
| H04N 21/4147 | (2011.01) |
| H04N 21/441 | (2011.01) |
| H04N 21/432 | (2011.01) |
| H04N 21/4335 | (2011.01) |
| H04N 21/436 | (2011.01) |

(52) U.S. Cl.
CPC ..... *H04N 21/44204* (2013.01); *H04N 21/4147* (2013.01); *H04N 21/441* (2013.01); *H04N 21/442* (2013.01); *H04N 21/44222* (2013.01); *H04N 21/432* (2013.01); *H04N 21/4325* (2013.01); *H04N 21/4335* (2013.01); *H04N 21/43615* (2013.01)

(58) Field of Classification Search
CPC ............ H04N 21/4147; H04N 21/441; H04N 21/442; H04N 21/44204; H04N 21/44222; H04N 21/432; H04N 21/4325
USPC ........ 725/9–13, 25, 30, 37, 58, 105, 114–117
See application file for complete search history.

(56) References Cited

U.S. PATENT DOCUMENTS

| | | | |
|---|---|---|---|
| 2004/0244030 A1* | 12/2004 | Boyce et al. ..................... | 725/25 |
| 2007/0033232 A1* | 2/2007 | Malloy ......................... | 707/200 |
| 2007/0250853 A1* | 10/2007 | Jain et al. ........................ | 725/28 |
| 2008/0168525 A1* | 7/2008 | Heller et al. .................. | 725/139 |
| 2009/0210533 A1* | 8/2009 | Verhaegh et al. ............. | 725/118 |
| 2010/0088291 A1* | 4/2010 | Bhogal et al. ................. | 707/705 |
| 2010/0092160 A1* | 4/2010 | Bhogal et al. ................. | 386/124 |

\* cited by examiner

*Primary Examiner* — Jeremy Duffield
(74) *Attorney, Agent, or Firm* — Merchant & Gould P.C.

(57) ABSTRACT

Management of and utilization of information related to recorded video content are provided. For any given piece of recorded content, identification information for any of a number of interested persons may be associated with the recorded content. After each interested person associated with a given piece of recorded content views or watches the content or decides he or she is not interested in the recorded content, the recorded content may be deleted. A graphical user interface may be provided for showing the viewing status of persons associated with a given piece of recorded content and for allowing each person associated with the recorded content to manage their individual viewing status. Information about content viewed by identified persons may be used to direct advertising or suggested content to one or more identified persons.

20 Claims, 5 Drawing Sheets

| TITLE | USER | | | |
|---|---|---|---|---|
| | ALICE | BOB | JANE | RON |
| MOVIE 1 | X | O | ND | X |
| MOVIE 2 | O | O | O | |
| SPORTS SHOW 1 | X | X | X | X |
| EDUCATION SHOW 1 | X | X | X | X |

FIG. 3A

| TITLE | USER | | | |
|---|---|---|---|---|
| | ALICE | BOB | JANE | RON |
| MOVIE 1 | X | O | ND | X |
| MOVIE 2 | O | O | O | |
| SPORTS SHOW 1 | X | X | X | X |
| EDUCATION SHOW 1 | X | X | X | X |

FIG. 3B

| KEY | | |
|---|---|---|
| SYMBOL | DESCRIPTION | NOTES |
| X | VIEWED | READY FOR DELETE |
| O | NOT VIEWED | DESIRED FOR VIEWING |
| N | NOT VIEWED | NOT DESIRED FOR VIEWING |
| ND | YES/NO VIEWED | DO NOT DELETE |

MANAGEMENT AND UTILIZATION OF RECORDED VIDEO CONTENT

BACKGROUND OF THE INVENTION

With modern video and broadcast content delivery systems, a great variety of content is available to the viewing public, such as movies, sports shows, entertainment shows, informational shows, entertainment content, advertising content, et cetera. Because viewers have busy lives and cannot always watch desired content when it is broadcast or otherwise delivered, video recording systems, for example digital video recording (DVR) systems, have become popular with which a viewer may record a given piece of content for viewing at an available time.

It is not uncommon for a given household, dormitory, business or other congregation of viewers to have multiple persons who would like to view a piece of recorded content at different times based on individual availability. For example, in a given household, four members of a family may desire to view a piece of recorded content, such as an educational movie, but their individual schedules may require them to watch the movie at four different times. Because each member of the family does not know when others have viewed the recorded content, they do not delete the recorded content, and memory space of the recording device or at a network-based recording system may be needlessly occupied. Because video recording devices or systems have limited memory space, needless occupation of memory space may prevent viewers from storing additional content or may cause viewers to unnecessarily purchase additional memory space.

It is with respect to these and other considerations that the present invention has been made.

SUMMARY OF THE INVENTION

Embodiments of the present invention solve the above and other problems by providing for management of and utilization of information related to recorded video content. According to embodiments, for any given piece of recorded content, identification information for any of a number of interested persons may be associated with the recorded content. Identification information, for example, a name, for each interested person may be associated with the content prior to recording the content or after recording the content. The identification information may be obtained from a list of interested persons, for example, members of a family, or identification information may be entered for each interested person on a one-by-one basis as content is recorded or as a given person desires to be associated with the recorded content.

After each interested person associated with a given piece of recorded content views or watches the content or decides he or she is not interested in the recorded content, the recorded content may be deleted. A graphical user interface may be provided for showing the viewing status of persons associated with a given piece of recorded content and for allowing each person associated with the recorded content to manage their individual viewing status.

According to other embodiments, information about content viewed by identified persons may be used to direct advertising or suggested content to one or more identified persons.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 3A illustrates a graphical user interface for managing viewing information associated with one or more recorded content items.

FIG. 3B illustrates a graphical user interface for providing definitional information for content viewing status information illustrated in FIG. 3A.

DETAILED DESCRIPTION

Figure 1:
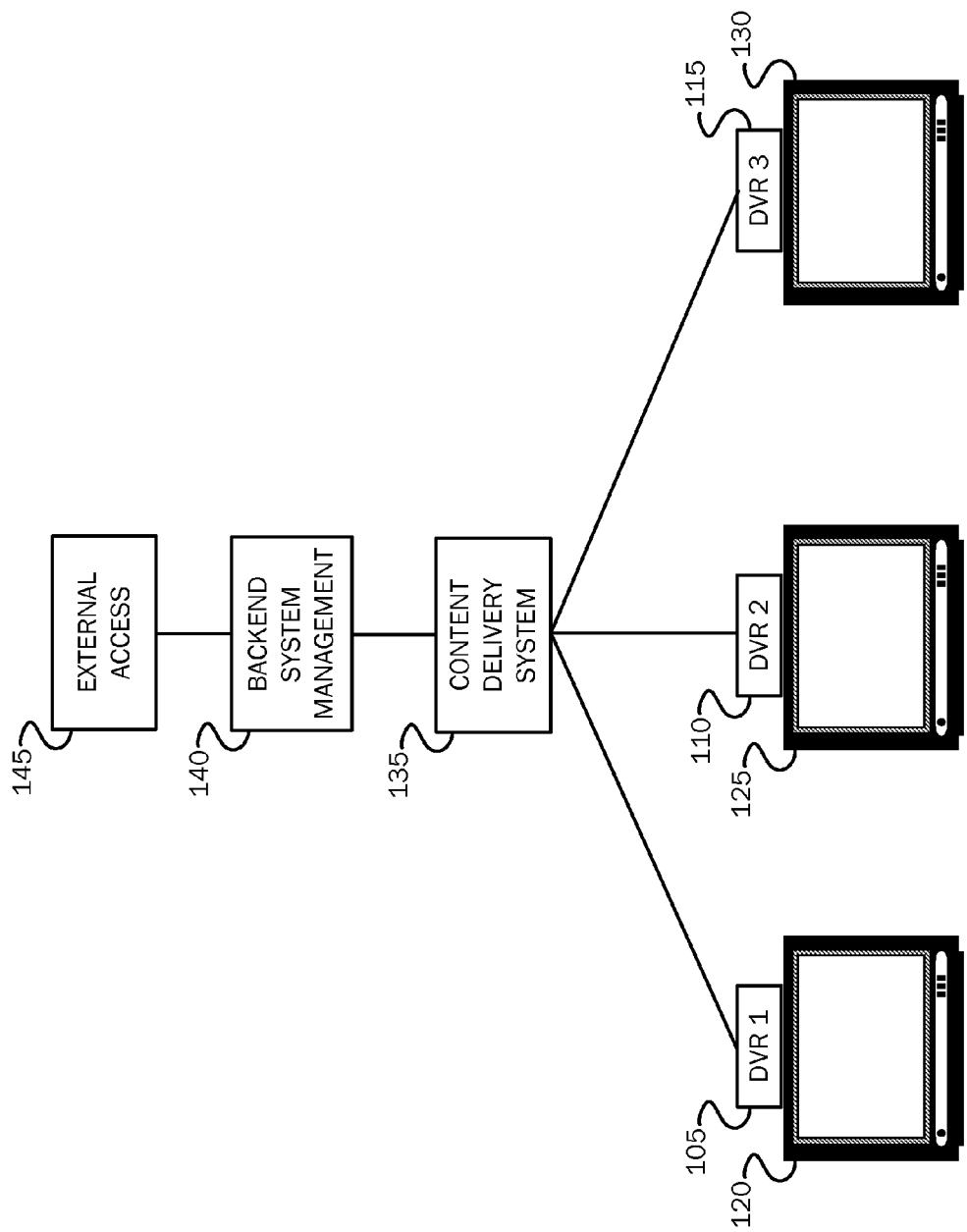
FIG. 1 illustrates an example system architecture with which embodiments of the present invention may be implemented.

As briefly described above, embodiments of the present invention are directed to management of and utilization of information associated with recorded video content. Prior to or after recording a given piece of video content, one or more viewers or desired viewers of the recorded content may be associated with the recorded content for tracking viewing of the recorded content on a viewer-by-viewer basis. Identification information for each viewer or intended viewer, for example, a name, may be associated with each piece of recorded content to allow individual viewers to mark content as viewed, not viewed, or not desired to allow for deletion of recorded content after each viewer desiring access to the recorded content has been satisfied. Additionally, an individual viewer may note a recorded video content item as viewed or not viewed, but with a desire that the content item not be deleted from storage. According to embodiments, recorded content may be maintained at a local digital video recording device associated with an individual television set, or recorded content may be maintained at a local serving recording device accessible at one or more associated television sets, or recorded content may be maintained at a network-based recording device.

As described in detail below, a graphical user interface may be provided to one or more users at a local television set via a content delivery device, such as a set-top box or other content delivery computing device, with which viewers may associate identification information for themselves with one or more pieces of recorded content. After a given piece of recorded content has been viewed by an individual viewer, the recorded content may be marked as viewed by the viewer to allow other viewers associated with the recorded content to know the viewing status of other viewers. Once all viewers desiring access to a given piece of content have marked the content as either viewed or not desired, the given piece of recorded content may be deleted so that valuable local or remote memory space at which recorded content is stored may be released for use in storing other pieces of recorded content. According to embodiments, as will be described further below, viewers may interact with and manage recorded content locally, for example, via interaction with a set-top box or digital video recorder, or remotely via a web services system or mobile computing device network (e.g., mobile phone) operatively associated with the storage media containing the recorded content.

For example, if four members of a household desire to view a particular piece of recorded content, for example, a recorded sports show, each member of the household may view the content, mark the content as viewed via a provided graphical user interface, and may simultaneously see the viewing status of other members of the family. If all members of the family desiring access to the recorded piece of content have not yet viewed the content, then a presently accessing viewer may readily see that the content should not be deleted. On the other hand, if the presently accessing viewer sees that all interested persons have viewed the content, then the content may be deleted. As will be described below, content viewed by all interested persons, or otherwise available for deletion, may be manually deleted or may be automatically deleted.

In addition to the foregoing, information about content items stored and viewed by various interested persons may be utilized by content delivery providers for directing advertising or other interesting information to viewers. For example, if it is noted by a content delivery provider that all members of a particular household or other congregation of viewers are interested in viewing a particular piece of content associated with a given actor, the content delivery provider may provide advertising information or may provide suggestions to the viewers via the content delivery system of other content associated with the same actor.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention allow for management of and utilization of information associated with recorded video content. FIG. 1 illustrates an example system architecture with which embodiments of the present invention may be implemented. The system architecture illustrated in FIG. 1 is exemplary of one of a number of types of content delivery systems with which video content may be provided to the viewing public in homes, businesses, schools, and the like. The television sets 120, 125, 130 are illustrative of one or more television sets that may be positioned in a home, business, school, etc. for allowing one or more users to view delivered content and for allowing users to record and subsequently view recorded content.

The digital video recorders 105, 110, 115 are illustrative of stand alone digital recording devices (DVRs) with which received video content may be recorded for subsequent playback. The DVRs 105, 110, 115 may be operated as stand alone recording devices, or the DVRs may be operated as component functionalities of a content delivery computing device, such as a set-top box or other general purpose computing device operative for delivering video content to the televisions sets 120, 125, 130. According to embodiments, recorded content may be stored at individual recording devices 105, 110, 115, or recorded content may be stored at a single recording device 105 accessible by associated recording devices 110, 115. For example, a single recording device may act as a server in a household, school, business, or other facility for storing recorded content and for distributing recorded content to associated devices 110, 115 maintained at the same facility. Alternatively, recorded content may be recorded via a local recording device 105, 110, 115, but the recorded content may be stored remotely at a storage medium maintained by the content delivery system. Recorded content may then be viewed at a given television set 120, 125, 130 from a storage medium maintained at the content delivery system 135, and the stored content may be delivered to the television sets 120, 125, 130 upon demand in a similar manner as would any other content be delivered from the content delivery system 135. In addition, content may be recorded remotely at a recording device housed at the content delivery system and may be delivered to the television sets 120, 125, 130 via a local content delivery computing device 105, 110, 115 (e.g., a set-top box/DVR combination device).

The content delivery system 135 is illustrative of a system for delivering various types of broadcast or recorded content to the television sets 120, 125, 130. The content delivery system 135 may be in the form of a cable services system, a satellite broadcast/dish receiver delivery system or the like for delivering video content to the television sets 120, 125, 130. The back end management system 140 is illustrative of an administrative back end system at which management of content delivered via the content delivery system may be performed. The back end management system 140 may include billing systems, system management functionality, databases for maintaining information on subscribers of the content delivery system 135, and the like. According to embodiments of the present invention, profile information for viewers and/or intended viewers of recorded content may be maintained at individual recording devices 105, 110, 115, or such information may be maintained at the back end management system 140. That is, information associating one or more viewers with recorded content items may be maintained locally at the recording devices 105, 110, 115, or may be maintained remotely at the back end management system 140. According to one embodiment, the content delivery system 135 and the back end management system 140 may be implemented as a cable services system which will be described below with respect to FIG. 5.

The external access 145 is illustrative of one or more mechanisms for accessing the back end management system 140 for managing recorded content items stored at a local recording device 105, 110, 115, or stored at the content delivery system 135. According to one embodiment, external access means 145 may be in the form of a remote control or keyboard operatively associated with the recording devices 105, 110, 115 for allowing a user to communicate with the recording devices 105, 110, 115 for recording content and for managing content as described herein. Alternatively, the external access means 145 is illustrative of one or more communication means for accessing the back end management system 140 for managing the recording of, deletion of or other utilization of stored content. For example, the external access means 145 may be in the form of a web services system with which a user may contact the content delivery system via a wire line or wireless computing device, such as a desktop or laptop computer for directing the recording of one or more content items, directing the deletion of one or more stored content items, or for marking one or more content items as viewed, not viewed, or not desired as described below in accordance with embodiments of the invention. Additionally, an individual viewer may note a recorded video content item as viewed or not viewed, but with a desire that the content item not be deleted from storage. In addition, the external access means 145 may be illustrative of a wireless communication means, for example, a mobile telephone or other mobile computing device with which a user may contact the content delivery system through the back end management system 140 for directing management of recorded content items, as described below.

According to embodiments, a software module and associated database functionality with sufficient computer executable instructions for performing the management of and utilization of recorded video content, described herein, may be maintained at the local devices 105, 110, 115. Alternatively, the software module and associated database functionality may be maintained and operated at the content delivery system or back end management system, and the functionality of the software module and database functionality may be accessed remotely by one or more of the local devices 105, 110, 115. For example, viewing information and processing thereof, as described below with respect to FIG. 4, may be performed entirely at a local device 105, 110 115, or these functions may be performed remotely at the content delivery system or back end management system via access by one of the local devices 105, 110, 115. Alternatively, these functions may be separated, where for example, processing of viewing information is performed locally at a device 105, 110, 115, but viewing information/data is maintained at a database housed at the back end management system 140.

The invention may be used in combination with any number of computer systems operative to receive and process information and instructions for the management of and utilization of recorded video content, such as in desktop environments, laptop or notebook computer systems, tablet computers, multiprocessor systems, micro-processor based or programmable consumer electronics, networked PCs, mini computers, main frame computers and the like. Embodiments of the present invention may be utilized in various distributed computing environments where computer executable tasks and process steps are performed by remote processing devices that are linked through a communications network in a distributed computing environment, and where programs may be located in both local and remote memory storage.

Computer executable tasks and process steps (as described below with reference to FIG. 4) performed in accordance with embodiments of the invention may be stored in and executed by a single computing device 105, 110, 115, or may be stored and performed across disparate computing devices. Embodiments of the invention, for example, may be implemented as a computer executed method or process, a computing system, or as an article of manufacture, such as a computer program product or computer-readable media. Embodiments of the invention may be implemented as computer executable instructions stored on one or more computer-readable media accessible and executable by one or more computing devices. Such computer-readable media may include any form of volatile or non-volatile memory readable by a computing device, including but not limited to, hard disks, floppy disks, CD-ROM, DVD, flash media, carrier waves on which executable instructions are carried, or any other form of computer-readable memory.

Figure 2:
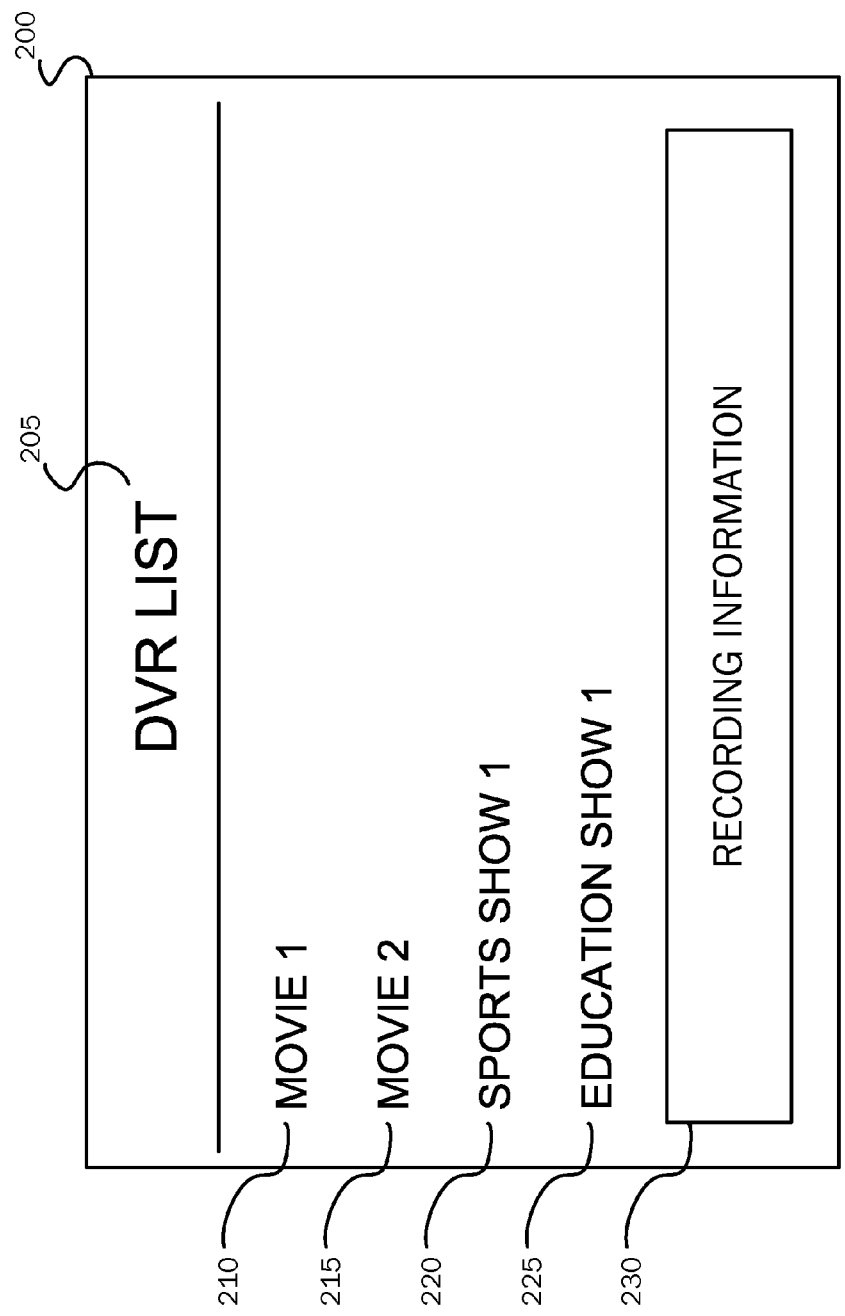
FIG. 2 illustrates a graphical user interface for showing a list of recorded content items and for accessing information about one or more listed recorded content items.

FIG. 2 illustrates a graphical user interface for showing a list of recorded content items and for accessing information about one or more listed recorded content items. As described above, one or more viewers of a given household, business, school, or other congregation of viewers may have recorded one or more pieces of video content. As described above, the recorded video content may be stored at an individual video recording device 105, 110, 115, or the recorded content may be stored at a single recording device 105 that may be accessed by associated recording devices 110, 115. Alternatively, the content may be stored at a remote storage location at the content delivery system 135 for access by one or more recording devices 105, 110, 115. The graphical user interface 200 is illustrative of any of a number of user interface layouts that may be presented to a user on a television set 120, 125, 130 for providing a listing 205 of recorded content items. For example, as illustrated in FIG. 2, a first movie 210, a second movie 215, a sports show 220, and an educational show 225 have been recorded either at a local recording device 105, 110, 115, or at a remote recording device at the content delivery system 135. As should be appreciated, the user interface 200 may be displayed on the television set 120, 125, 130 upon demand by a user of an associated local or remote recording device for quickly reviewing a listing of recorded content items.

According to an embodiment, a "Recording Information" button or tab 230 is provided for allowing one of a number of viewers to review the viewing status of the recorded content items by other members of the viewer's household, school, business, or other congregation of multiple viewers of the recorded content items, as illustrated in FIGS. 3A and 3B below. As should be appreciated, any number of suitable means for selectively causing a presentation of the viewing information associated with recorded content may be employed as opposed to the button 230. For example, a button on a remote control device or keyboard operatively associated with the devices 105, 110, 115 or equivalent remotely maintained devices may be utilized for launching the user interface components 300, 350.

FIG. 3A illustrates a graphical user interface for managing viewing information associated with one or more recorded content items. Upon selection of the recording information button or tab 230, a second graphical user interface 300 may be launched and displayed on the viewer's television set 120, 125, 130 via the associated recording device 105, 110, 115 or via the content delivery system 135. The user interface 300 provides viewing status information for each recorded content item for each viewer associated with the recorded content items. Referring to FIG. 3A, four example users "Alice," "Bob," "Jane," and "Ron" are associated with four recorded content items, including a first movie, a second movie, a sports show, and an education show. According to embodiments, each of the example users has been associated with each of the recorded content items which means that each user may desire to view the recorded content item, before the content item is deleted from local or remote memory space.

As illustrated in FIG. 3B, an additional graphical user interface 350 may be provided for giving definitional information for symbols used in the user interface 300. For example, the symbol "X" may indicate that an item has been viewed by a given user and that the item may be deleted with respect to that viewer. The symbol "O" may indicate that a recorded item has not been viewed by a given user and that the user still desires to view the associated content item. The symbol "N" may indicate that the associated content item has not been viewed by a given user and that the user does not desire to view the associated content item. The symbol "ND" may indicate that the content item may or may not have been viewed by an associated viewer, but that the content item should not be deleted.

According to an embodiment, a default viewing status value may be automatically applied to any recorded video content item for one or all viewers prior to receipt of a viewing status for any given item from any given individual viewer.

For example, if an individual viewer has not provided any viewing status information for a given content item, a default value of "0" indicating the item has not been viewed may be applied until the viewer updates the viewing status for the item. Or, a value of "ND" indicating the viewer may or may not have viewed the content item and indicating the content item should not be deleted may be applied.

According to one embodiment, in addition to viewing information provided for each recorded content item, additional information may be provided for each recorded content item such as ratings information, critical review information, and the like. As should be appreciated, such information may be provided via selectable links associated with each content title, or may be provided through the graphical user interface 300, for example, via a pivot table accessible by selecting a given content title.

Referring back to FIG. 3A, individual users/viewers may mark individual content items with one of the provided symbols to allow other users/viewers to know of the marking user/viewer's intentions with respect to a stored content item. Thus, by reviewing the user interfaces 300, 350, an individual user/viewer may quickly determine the viewing status of other viewers and may quickly determine whether a given content item may be deleted. For example, a viewer may wish to record a new content item only to find that his/her recording device 105, 110, 115, or that his/her available remote memory capacity is fully utilized. By reviewing the user interfaces 300, 350, the user may quickly determine that a given stored content item, for example, the sports show 220 or the education show 225 have been viewed by all interested viewers and that one or both of the content items may be deleted from memory in order to free up memory capacity for storing a new content item.

As should be appreciated, the layout and content illustrated in the graphical user interfaces 200, 300, 350 described above with reference to FIGS. 2, 3A and 3B are for purposes of example only and are not limiting of the vast number of layouts and content items that may be provided in the graphical user interfaces 200, 300, 350 in accordance with embodiments of the present invention described herein. In addition, the user interface components may be displayed on a number of suitable display devices, such as desktop or laptop computers, handheld computing devices, mobile phone, etc. via the external access means 145, described above.

Figure 4:
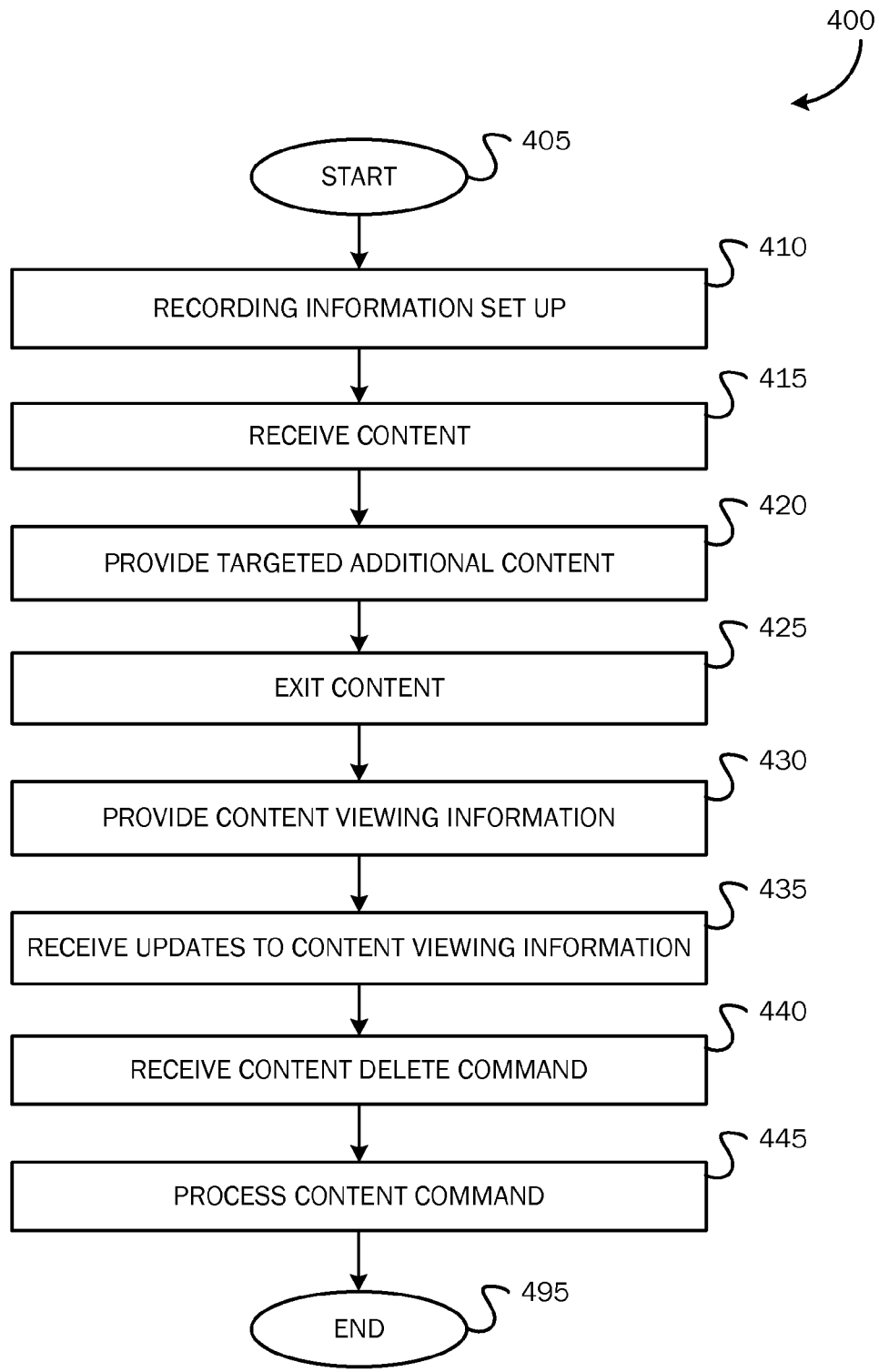
FIG. 4 illustrates a process flow for management of and utilization of information associated with recorded content items.

Having described a system architecture and example graphical user interfaces with which embodiments of the present invention may be implemented, FIG. 4 illustrates a process flow for management of and utilization of information associated with recorded content items. The routine 400 begins at start operation 405 and proceeds to operation 410 where recording management information is set up for a given content item. As should be appreciated, recording management information for a given content item may include associating an identification for a particular viewer, for example, the viewer's name with the given content item. As described above with reference to FIG. 3A, the names of each member of a household, the names of each member of a school dormitory area, the names of members of an office, or any other congregation of users that are interested in viewing a given recorded content item may be associated with the content item at operation 410.

According to one embodiment, identification information for a content viewer may be associated with a content item when the item is recorded. For example, when a user selects a content item, for example, a movie, sports show, educational show, and the like, for recording via his/her local recording device 105, 110, 115, or via a remote recording device at the content delivery system 135, a user interface component, such as a pop up dialog box may be deployed for asking the user if the user desires to be associated with the selected item. If the user provides identification information, for example, the user's name, then after the selected content item is recorded, the user's identification may be populated in a user interface 300, as illustrated in FIG. 3A, for showing viewing status for the user for the associated selected content item. According to embodiments, identification information or any other input from a user/viewer may be performed via any suitable means for communicating with the device 105, 110, 115 or equivalent remotely operated device, for example, a remote control, a keyboard operatively associated with the recording/content delivery devices, or any device accessible via the external access means 145, described above.

When the user associates his/her identification with the recorded content item, the user may be notified via a pop up dialog box or other user interface component that the selected content item has already been recorded and stored. In that case, the user may be prompted to add the user's identification to an existing list of users associated with the recorded content item, as illustrated above in FIG. 3A. As should be appreciated, if the desired item has already been recorded, the desired item may already be listed in a listing of recorded items, such as illustrated in FIG. 2. Thus, the user may select a previously recorded content item followed by associating the user's identification, for example, his/her name to the previously recorded content item so that the user's viewing status information will now be provided along with other viewers associated with the previously recorded content item.

Alternatively, after a selected item has been fully recorded, a pop up dialog box or other user interface component may be automatically presented to inform the user that he/she may associate identification information with the recorded item so that his/her subsequent viewing status may be reviewed by other persons interested in the recorded content item, as described above with reference to FIGS. 3A and 3B. Alternatively, prior to recording a given content item, one member of a household, office, school dormitory, or other congregation of persons interested in the content item may launch a graphical user interface component, such as the interface 300, for entering identification information, for example, names, for each member of the group of interested viewers. For example, a member of a family may launch the user interface 300 and manually enter the names of each member of the family in advance of recording any desired content item. Then, when content items are subsequently recorded, the content items may be associated with one or more of the family members listed in the user interface 300 so that subsequent viewing information for each of the family members may be reviewed in the user interface 300 by other members of the household to prevent inadvertent deletion of a recorded content item before all family members who desire the recorded content item have had an opportunity. According to yet another embodiment, each member of a group of interested viewers may be required to log on to the recording device 105, 110, 115 or to an equivalent remotely housed recording device at the content delivery system 135 in order to associate identification information with a given content item or to delete or otherwise modify information applicable to a stored content item.

Referring still to FIG. 4, at operation 415, upon selection of a given content item, for example, a movie, a sports show, an education show, and the like, the selected content may be provided on the user's television set 120, 125, 130 via the recording device 105, 110, 115, or via a remotely housed recording device at the content delivery system 135. At operation 420, according to one embodiment, targeted additional content may be provided to a viewer of the selected content item via the content delivery system 135. For example, at the back end management system 140, a user profile may be maintained on each content viewer associated with recorded content. Based on an association of each viewer to various types of content, targeted advertising or suggested content may be provided by the content delivery system to the viewer via his/her television 120, 125, 130. For example, if profile information maintained at the back end management system 140 shows that a given viewer in a given household is always associated with movies starring a particular actor, such information may be utilized by the content delivery system for providing advertising about pay-per-view or on demand available movies starring the same actor. For another example, if a given viewer or combination of viewers in a particular household are always associated with an educational show about household pets, profile information maintained for each of these viewers may cause the managers of the content delivery system to provide advertising information about pet stores, pet supplies, veterinary services, and the like to these particular viewers.

At operation 425, the presently provided and previously recorded content item is exited. For example, the recorded content item may have run its complete duration and may have terminated automatically, or the viewer may have decided to end viewing of the content item and may have manually exited from the content item being viewed. At operation 430, according to an embodiment, the user interfaces 300 and 350, illustrated above with respect to FIGS. 3A, 3B, may be presented to the viewer to allow the viewer to mark the viewed content and to determine whether the viewed content may be deleted. For example, if the viewer has fully viewed the content, the viewer may mark the content as viewed and ready to delete with respect to the viewer. If the user has not fully viewed the content, the user may mark the content as not viewed and still desired for viewing. Alternatively, the viewer may mark the content as not viewed and not desired for viewing, or the viewer may have determined that the content should not be deleted regardless of the viewer's viewing status, and the viewer may mark the content as "do not delete."

In addition to providing content viewing information upon exiting from the viewing of a given content item, such content viewing information may be provided by a viewer upon demand. That is, a viewer may simply desire to launch the user interfaces 300, 350 apart from the viewing of any particular content item to view the current viewing status of various viewing members in association with one or more content items for purposes of maintenance of local or remote content recording memory space.

In addition to the foregoing, content viewing information, as illustrated in FIGS. 3A and 3B, may be provided automatically under various circumstances. For example, if four members of a household are associated with a given recorded content item, and three members of the household have already viewed the content item and have marked the content item as viewed and ready to delete, once the fourth and final member of the household views the recorded content item, the user interfaces 300, 350 may be automatically presented to the fourth and final viewer to inform the viewer that he/she is the last viewer and that the content may be ready for deletion if desired by the fourth and final viewing member. The content viewing information illustrated in FIGS. 3A and 3B may also be presented automatically to a viewing member upon receipt of a delete command for the content item from another viewing member. For example, if a first viewer is watching content via a first television 120 and a second viewer is watching recorded content via a second television 125, and the second viewer issues a delete command to delete a recorded content item, an alert may be provided on any televisions networked to the second television to alert users/viewers of the other television sets 120, 130 that a given recorded content item is being deleted. If other viewers disagree with the deletion command, the other viewers may take action to prevent the deletion of the recorded content item, for example, asking the deleting viewer to stop the deletion process, issuing an override of the delete command, or other appropriate action.

Referring still to FIG. 4, at operation 435, any viewing status updates provided by the present viewer of the presently being viewed recorded content item are received locally at the associated recording device 105, 110, 115, or at a corresponding remote recording device operated at the content delivery system 135. In response, a database maintained at the respective recording device is updated to include updated viewing status information entered by the viewer so that subsequent viewers will see an up-to-date viewing status information for the given content item.

At operation 440, a delete command is received for a given recorded content item. According to embodiments, a number of delete options may be provided in response to a received delete command. First, the information provided in the user interface components 300, 350 may be for purposes of information only and may not prevent the deletion of any recorded item regardless of the viewing status of viewing members associated with the recorded item. That is, if any viewing member issues a delete command for any recorded item, the recorded item will simply be deleted regardless of the viewing status of other viewing members. Alternatively, if any item is marked in a manner indicating that the item has not been viewed by a viewing member or that the item should not be deleted, then the user's delete command will be rejected for the associated recorded content item. That is, the viewing member will not be allowed to delete the content item until the viewing status of all viewing members is marked as allowing deletion. Alternatively, in either case, a pop up dialog box may be presented to the viewing/deleting member asking whether he/she is sure he/she wants to delete the associated recorded content item. If the user is part of a viewing member group requiring password or other authentication credentials prior to updating the status of recorded content items, including deleting content items, a viewer issuing a delete command may be asked to provide a password or other credentials before a recorded content item may be deleted.

In addition, as described above, upon receipt of a delete command, other members of a viewing group may be notified of the receipt of the delete command to allow other members of a viewing group to contest or otherwise prevent deletion of the content. For example, upon receipt of a deletion command, a specified period of time may be required before the recorded content item is actually deleted to allow other members of the viewing group to contest the deletion by providing a counter command. For example, upon receipt of a deletion command, a user interface component may be presented notifying the viewer that the content item will be deleted in 24 hours. The user interface 300 may be updated for the content item to show that the content item is set for deletion at a specified date/time. If other members of the viewing group review the user interface 300 to review viewing status for a content item, they may realize that the content item is set for deletion, and they may be allowed to issue a counter command to prevent the item from being deleted.

According to one embodiment, other members of the viewing group may be notified through other communications means, for example, the external access means 145, described above. For example, a member of a viewing group may be notified via his/her work computer, for example, via electronic mail, that a given content item is set for deletion to allow the user to access the content delivery system 135 for issuing a counter command to prevent the content item from being deleted. Similarly, alerts may be provided to members of a viewing group via wireless communications devices, for example, cell phones, personal digital assistants, and the like to allow other members of a viewing group to prevent a given content item from being deleted if they desire that the content item should remain available for subsequent viewing.

According to embodiments, deletion of content items may be dictated by a hierarchy established for members of a viewing group associated with the content items. Establishing a hierarchy for viewing status update and management of recorded video content items may allow a first viewer, for example, a parent to update viewing status for and manage recorded video content items (e.g., delete stored items) for both the first and for a second viewer, for example, a child. But, the second viewer may only be allowed to update viewing status for and manage recorded video content items stored for the second viewer. According to another embodiment recorded content items may be automatically deleted to open storage space for other recorded content items. As with the above described hierarchy, automatic deletion may be applied first to a viewer having a lower storage use order than another user (e.g., child with a lower storage order than a parent). As should be appreciated such hierarchies for management of stored content may be set up according to a vast number of use cases, for example, supervisor/employee, parent/child, teacher/student, ages of members of a viewing group, and the like.

At operation 445, any commands provided by an accessing viewer are processed, as described herein. That is, a content delete command may be processed as described above with reference to operation 440. Other commands may be processed including simple changes in status, for example, a change from "not viewed" to "viewed" status received by a viewer. The routine ends at operation 495.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Figure 5:
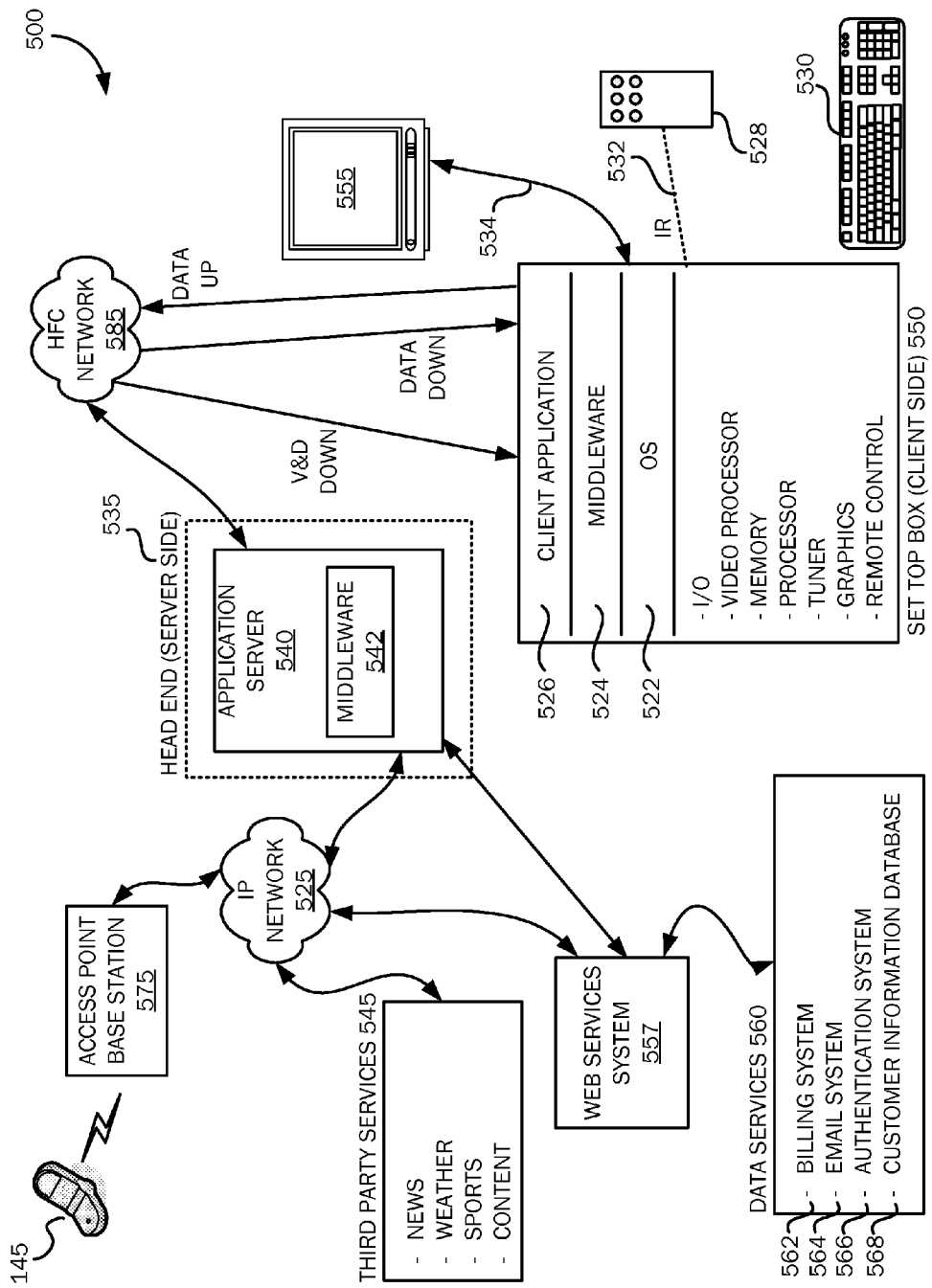
FIG. 5 illustrates a system architecture of a cable services system with which content may be delivered and recorded according to embodiments of the present invention.

As mentioned above, the content delivery system 135 and the back end management system 140 may take the form of any distributed computing and communications network operative to deliver content to a local device 105, 110, 115 as described herein. According to one embodiment, the content delivery system and back end management system are implemented via a cable television services system. With reference to FIG. 5, a cable television/services system (hereafter referred to as "CATV") architecture 500 that may serve as an exemplary operating environment for embodiments of the invention is described.

Referring now to FIG. 5, digital and analog video programming, information content and interactive television services are provided via a hybrid fiber coax (HFC) network 585 to a television set 555 for consumption by a cable television/services system customer. As is known to those skilled in the art, HFC networks 585 combine both optical fiber and coaxial cable lines. Typically, optical fiber runs from the cable head end 535 to neighborhoods of 500 to 2,000 customers. Coaxial cable runs from the optical fiber feeders to each customer. According to embodiments of the present invention, the functionality of the HFC network 585 allows for efficient bidirectional data flow between the client-side set-top box 550 and the server-side application server 540 of the present invention.

According to embodiments of the present invention, the CATV system 500 is in the form of a distributed client-server computing system for providing video and data flow across the HFC network 585 between server-side services providers (e.g., cable television/services providers) via a server-side (backend) head end 535 and a client-side customer via a client-side set-top box (STB) functionally connected to a customer receiving device, such as the television set 555. As is understood by those skilled in the art, modern CATV systems 500 may provide a variety of services across the HFC network 585 including traditional digital and analog video programming, telephone services, high speed Internet access, video-on-demand, and information services.

On the client side of the CATV system 500, digital and analog video programming and digital and analog data are provided to the customer television set 555 via the set-top box (STB) 550. Interactive television services that allow a customer to input data to the CATV system 500 likewise are provided by the STB 550. As illustrated in FIG. 5, the STB 550 is a multipurpose computing device having a computer processor, memory and an input/output mechanism. The input/output mechanism of a STB 550 receives input from server-side processes via the HFC network 585 and from customers via input devices such as the remote control device 528 and the keyboard 530. The remote control device 528 and the keyboard 530 may communicate with the STB 550 via a suitable communication transport such as the infrared connection 532. The STB 550 also includes a video processor for processing and providing digital and analog video signaling to the television set 555 via a cable communication transport 534. A multi-channel tuner is provided for processing video and data to and from the STB 550 and the server-side head end system 535, described below.

The STB 550 also includes an operating system 522 for directing the functions of the STB 550 in conjunction with a variety of client applications 526. For example, if a client application 526 requires a news flash from a third-party news source to be displayed on the television 555, the operating system 522 may cause the graphics functionality and video processor of the STB 550, for example, to output the news flash to the television 555 at the direction of the client application 526 responsible for displaying news items. According to embodiments of the present invention, DVRs 105, 110, 115 may be integrated with respective STBs 550 such that all DVR functionality described herein is performed at a STB 550.

Because a variety of different operating systems 522 may be utilized by a variety of different brands and types of set-top boxes, a middleware layer 524 is provided to allow a given software application to be executed by a variety of different operating systems. According to an embodiment of the present invention, the middleware layer 524 may include a set of application programming interfaces (API) that are exposed to client applications 526 and operating systems 522 that allow the client applications to communicate with the operating systems through common data calls understood via the API set. As described below, a corresponding middleware layer is included on the server side of the CATV system 500 for facilitating communication between the server-side application server and the client-side STB 550. According to one embodiment of the present invention, the middleware layer 542 of the server-side application server and the middleware layer 524 of the client-side STB 550 format data passed between the client side and server side according to the Extensible Markup Language (XML). As should be appreciated XML is only one example formatting type and other suitable formatting languages or types may be utilized. As also should be appreciated by those skilled in the art, although some embodiments described in this specification are oriented to middleware installed and executed on a STB 550, alternative embodiments implemented as firmware or as hardware are well within the scope of the present invention.

According to one embodiment, the set-top box 550 passes digital and analog video and data signaling to the television 555 via a one-way communication transport 534. According to other embodiments, two-way communication transports may be utilized, for example, via high definition multimedia interface (HDMI) ports. The STB 550 may receive video and data from the server side of the CATV system 500 via the HFC network 585 through a video/data downlink and data via a data downlink. The STB 550 may transmit data from the client side of the CATV system 500 to the server side of the CATV system 500 via the HFC network 585 via one data uplink. The video/data downlink is an "in band" downlink that allows for digital and analog video and data signaling from the server side of the CATV system 500 through the HFC network 585 to the set-top box 550 for use by the STB 550 and for distribution to the television set 555. As is understood by those skilled in the art, the "in band" signaling space may operate across a variety of frequency ranges, for example, at a frequency between 54 and 1000 megahertz. The signaling space is generally divided into 6 megahertz channels in which may be transmitted a single analog signal or a greater number (e.g., up to ten) digital signals.

The data downlink and the data uplink, illustrated in FIG. 5, between the HFC network 585 and the set-top box 550 comprise "out of band" data links. As is understand by those skilled in the art, the "out of band" frequency range generally lies between zero and 54 megahertz. According to embodiments of the present invention, data flow between the client-side set-top box 550 and the server-side application server 540 is typically passed through the "out of band" data links. Alternatively, an "in band" data carousel may be positioned in an "in band" channel into which a data feed may be processed from the server-side application server 540 through the HFC network 585 to the client-side STB 550. Operation of data transport between components of the CATV system 500, described with reference to FIG. 5, is well known to those skilled in the art.

Referring still to FIG. 5, the head end 535 of the CATV system 500 is positioned on the server side of the CATV system and includes hardware and software systems responsible for originating and managing content for distributing through the HFC network 585 to client-side STBs 550 for presentation to customers via televisions 555. As described above, a number of services may be provided by the CATV system 500, including digital and analog video programming, interactive television services, telephone services, video-on-demand services, targeted advertising, and provision of information content. According to an embodiment, the functionality of the content delivery system 135 may be performed at the head end 535.

The application server 540 is a general-purpose computing system operative to assemble and manage data sent to and received from the client-side set-top box 550 via the HFC network 585. As described above with reference to the set-top box 550, the application server 540 includes a middleware layer 542 for processing and preparing data from the head end of the CATV system 500 for receipt and use by the client-side set-top box 550. For example, the application server 540 via the middleware layer 542 may obtain data from third-party services 545 via the Internet 525 for transmitting to a customer through the HFC network 585 and the set-top box 550. For example, a weather report from a third-party weather service may be downloaded by the application server via the Internet 525. When the application server 540 receives the downloaded weather report, the middleware layer 542 may be utilized to format the weather report for receipt and use by the set-top box 550. According to one embodiment of the present invention, data obtained and managed by the middleware layer 542 of the application server 540 is formatted according to the Extensible Markup Language and is passed to the set-top box 550 through the HFC network 585 where the XML-formatted data may be utilized by a client application 526 in concert with the middleware layer 524, as described above. As should be appreciated by those skilled in the art, a variety of third-party services data, including news data, weather data, sports data and other information content, may be obtained by the application server 540 via distributed computing environments such as the Internet 525 for provision to customers via the HFC network 585 and the set-top box 550. According to an embodiment of the present invention, digital video recording functionality may be located remotely on the head end (server side) 535 and called upon by a client set-top box 550.

As illustrated in FIG. 5, the services provider data services 560 include a number of services operated by the services provider of the CATV system 500 which may include data on a given customer. For example, a billing system 562 may include information such as a customer's name, street address, business identification number, Social Security number, credit history, and information regarding services and products subscribed to by the customer. An electronic mail system 564 may contain information such as electronic mail addresses, high-speed Internet access subscription information and electronic mail usage data. An authentication system 566 may include information such as secure user names and passwords utilized by customers for access to network services. According to an embodiment, the functionality and data services of the back end management system 140, described above, may be implemented at the services provider data services 560.

The customer information database 568 may include general information about customers such as place of employment, business address, business telephone number and demographic information such as age, gender, educational level, and the like. The customer information database may also include information on products and services subscribed to by a customer from her cable services provider. For example, in accordance with embodiments of the present invention, the customer information database may contain data to allow a determination as to whether a particular product or service is already provisioned at a customer service address or whether a work order is pending for a particular product or service provisioning at the customer service address. The customer information database may also include information that allows for a determination as to whether prerequisites for provisioning a requested product or service are met by a requesting customer. For example, if a customer requests electronic mail services and high speed Internet access is a prerequisite for electronic mail services, the customer information database may be queried to determine whether the required Internet access is provisioned at the requesting customer location or address. According to an embodiment, viewing information stored for recorded content items may be maintained for each viewer at the customer information database 568.

As should be understood by those skilled in the art, the disparate data services systems 562, 564, 566, 568 are illustrated as a collection of data services for purposes of example only. The example data services systems comprising the data services 560 may operate as separate data services systems, which communicate with a web services system (described below) along a number of different communication paths and according to a number of different communication protocols Referring still to FIG. 5, a web services system 557 is illustrated between the application server 540 and the data services 560. According to embodiments of the present invention, the web services system 557 serves as a collection point for data requested from each of the disparate data services systems comprising the data services 560. When the application server 540 requires customer profile data from one or more of the data services 560 for preparation or update of a customer profile, the application server 540 passes a data query to the web services system 557. The web services system formulates a data query to each of the available data services systems for obtaining any available data for a given customer as identified by a set-top box identification associated with the customer. The web services system 557 serves as an abstraction layer between the various data services systems and the application server 540. That is, the application server 540 is not required to communicate with the disparate data services systems, nor is the application server 540 required to understand the data structures or data types utilized by the disparate data services systems. The web services system 557 is operative to communicate with each of the disparate data services systems for obtaining necessary customer profile data. The customer profile data obtained by the web services system is assembled and is returned to the application server 540 for ultimate processing via the middleware layer 542, as described above.

According to embodiments of the present invention, an external access means 145, for example, a wire line or wireless computing device may access the CATV system 500 to interact with the recorded content viewing management methods and systems described herein. The access means 145 may gain access to the desired functionalities and data in a variety of suitable methods. According to one method, the access means 145 may access the CATV 500 via the IP network 525 to the Web Services System 557 and Data Services platform 560. According to one embodiment, the authentication system 566 may be utilized in association with the automated user authentication identification methods and systems described herein to allow the user access to desired applications, features and services of the example CATV 500 without cumbersome entry of authentication information discussed above. According to another embodiment, the access means 145 may be allowed direct access to the desired application via the authentication identification methods and systems described herein without passing through the authentication system 566.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method of managing recorded video content, comprising:
   receiving a first recorded video content item;
   storing the first received recorded video content item in an electronic storage medium;
   associating an identification for a first viewer with the first recorded video content item;
   associating an identification for a second viewer with the first recorded video content item;
   receiving from each of the first and second viewers a viewing status for the first recorded video content item, the viewing status including whether the first and second viewers desire to view the first recorded video content in the future;
   presenting a listing of one or more recorded video content items in a computer-generated user interface, the listing including the first recorded video content item and the viewing status for the first video content item from each of the first and second viewers; and
   in response to the first viewer indicating the first recorded video content item is to be deleted, notifying the second viewer by automatically providing the user interface to the second viewer listing the first recorded content item and that includes the viewing status for the first viewer indicating the first recorded video content item is scheduled to be deleted, in response to the second viewer receiving the user interface, the second viewer submitting a response by changing the viewing status of the second viewer that prevents deletion of the first recorded video content item, and in response to the second viewer receiving the user interface and not submitting a response by changing the viewing status of the second viewer within a specified period of time from the first user indicating the first content item is to be deleted, deleting the first recorded content item after the specified period of time.

2. The method of claim 1, wherein presenting the listing of one or more recorded video content items in the computer-generated user interface includes displaying the viewing status received from each of the first and second viewers in association with a display of an identification of the first recorded video content item and in association with a display of an identification of each of the first and second viewers such that the viewing status of each of the first and second viewers for the first recorded video content item may be reviewed by each of the first and second viewers.

3. The method of claim 2, wherein receiving from each of the first and second viewers a viewing status for the recorded video content item includes receiving from each of the first and second viewers a viewing status indicating whether the recorded video content item may be deleted from the electronic storage medium.

4. The method of claim 3, further comprising receiving a deletion command for deleting the first recorded video content item from the electronic storage medium.

5. The method of claim 4, further comprising determining whether the viewing status of each of the first and second viewers for the first recorded video content item indicates the first recorded video content item may be deleted from the electronic storage medium.

6. The method of claim 5, wherein if the viewing status of each of the first and second viewers for the first recorded video content item indicates the first recorded video content item may be deleted from the electronic storage medium, deleting the first recorded video content item from the electronic storage medium.

7. The method of claim 6, wherein if the viewing status of each of the first and second viewers for the first recorded video content item does not indicate the first recorded video content item may be deleted from the electronic storage medium, preventing deletion of the first recorded video content item from the electronic storage medium.

8. The method of claim 6, wherein if the viewing status of each of the first and second viewers for the first recorded video content item does not indicate the first recorded video content item may be deleted from the electronic storage medium, notifying any viewers associated with the first recorded content item who have not marked the recorded content item as viewed that the first recorded content item will be deleted.

9. The method of claim 8, further comprising receiving a command from one or more of the any viewers associated with the first recorded content item who have not marked the recorded content item as viewed to prevent deletion of the first recorded content item.

10. The method of claim 1, further comprising receiving from one or more of the first and second viewers a viewing status update for the first recorded video content item; and
updating the listing of one or more recorded video content items in the computer-generated user interface wherein the updated listing includes the first recorded video content item and an updated viewing status for the first video content item from any of the first and second viewers from whom an updated viewing status is received.

11. The method of claim 10, wherein prior to receiving from one or more of the first and second viewers a viewing status update for the first recorded video content item, requiring any of the first or second viewers desiring to update a viewing status update for the first recorded video content item to provide a credential information for showing the any of the first or second viewers desiring to update a viewing status update for the first recorded video content item is authorized to update the viewing status for the first recorded video content item.

12. The method of claim 1,
wherein associating an identification of the first viewer with the first recorded video content item is allowed upon receipt of a command to begin recording the first recorded video content item; and
further comprising associating an identification for the second viewer and any additional viewers of the first recorded video content item upon command from the second or any additional viewers of the first recorded video content item after associating an identification of the first viewer with the first recorded video content item.

13. The method of claim 1,
wherein associating an identification of the first viewer with the first recorded video content item is allowed after the first recorded video content item is recorded; and
further comprising associating an identification for the second viewer and any additional viewers of the first recorded video content item upon command from the second or any additional viewers of the first recorded video content item after associating an identification of the first viewer with the first recorded video content item.

14. The method of claim 1, wherein prior to associating an identification of the first and second viewers with the first recorded video content item, displaying the graphical user interface component for receiving identification information from the first and second viewers in association with the first recorded video content item.

15. The method of claim 1, further comprising establishing a hierarchy for viewing status update and management of recorded video content items for the first and second viewers wherein the first viewer may update viewing status for and manage recorded video content items stored in the electronic storage medium for both the first and second viewers, but whereby the second viewer may only update viewing status for and manage recorded video content items stored in the electronic storage medium for the second viewer.

16. The method of claim 1, wherein if one or more recorded video content items must be deleted to open storage space in the electronic storage medium, automatically deleting any recorded video content item for which a viewing status indicates the any recorded video content item has been viewed by the first and second viewers.

17. The method of claim 16, wherein if any recorded video content item must be deleted to open storage space in the electronic storage medium, automatically deleting a recorded video content item associated with the second viewer before deleting a recorded video content item associated with the first viewer if a hierarchy has been established giving the first viewer a higher storage use order than the second viewer.

18. The method of claim 1, further comprising recommending one or more content items to the first and second viewers based on the association of the first and second viewers with the first recorded video content item.

19. A video provision and management system operative to receive user commands for managing and utilizing recorded video content, the system comprising:
a computing device operative;
to receive a first recorded video content item;
to store the first received recorded video content item in an electronic storage medium;
to associate an identification for a first viewer with the first recorded video content item;
to associate an identification for a second viewer with the first recorded video content item;
to receive from each of the first and second viewers a viewing status for the first recorded video content item, the viewing status including whether the first and second viewers desire to view the first recorded video content in the future;
to present a listing of one or more recorded video content items in a graphical user interface, the listing including the first recorded video content item and the viewing status for the first video content item from each of the first and second viewers;
to determine whether the viewing status of the first viewer for the first recorded video content item indicates the first recorded video content item may be deleted from the electronic storage medium;
in response to the first viewer indicating the first recorded video content item is to be deleted, notify the second viewer by automatically providing the graphical user interface to the second viewer listing the first recorded content item and that includes the viewing status for the first viewer indicating the first recorded video content item is scheduled to be deleted, in response to the second viewer receiving the user interface, the second viewer to submit a response that prevents deletion of the first recorded video content item; and in response to the second user receiving the user interface and not submit a response by changing a the viewing status of the second viewer within a specified period of time from the first user indicating the first content item is to be deleted, to delete the first recorded content item after the specified period of time.

20. A memory containing computer executable instructions which when executed by a computer perform a method of managing recorded video content,
comprising:
receiving a first recorded video content item;
storing the first received recorded video content item in an electronic storage medium;
associating an identification for a first viewer with the first recorded video content item;
associating an identification for a second viewer with the first recorded video content item;
receiving from the first viewer a viewing status indicating whether the first recorded video content item may be deleted from the electronic storage medium, the viewing status including whether the first and second viewers desire to view the first recorded video content in the future;
displaying a user interface that includes the viewing status received from each of the first and second viewers in association with a display of an identification of the first recorded video content item and in association with a display of an identification of each of the first and second viewers such that the viewing status of each of the first and second viewers for the first recorded video content item may be reviewed by each of the first and second viewers;
in response to the first viewer indicating the first recorded video content item is to be deleted, notifying the second viewer by automatically providing the user interface to the second viewer listing the first recorded content item and that includes the viewing status for the first viewer indicating the first recorded video content item is scheduled to be deleted,
in response to the second viewer receiving the user interface, the second viewer submitting a response by changing the viewing status of the second viewer that prevents deletion of the first recorded video content, and in response to the second viewer receiving the user interface and not submitting a response by changing the viewing status of the second viewer within a specified period of time from the first user indicating the first content item is to be deleted, deleting the first recorded content item after the specified period of time.

\* \* \* \* \*